United States Patent
Berry et al.

(10) Patent No.: US 6,466,238 B1
(45) Date of Patent: Oct. 15, 2002

(54) COMPUTER OPERATING SYSTEM THAT DEFINES DEFAULT DOCUMENT FOLDER FOR APPLICATION PROGRAMS

(75) Inventors: Jon R. Berry, Woodinville; Robert F. Day, Bellevue; Eric R. Flo, Issaquah; Joseph H. Matthews; Richard S. Turner, Jr., both of Woodinville, all of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/107,110

(22) Filed: Jun. 30, 1998

(51) Int. Cl.[7] .................................................. G09G 5/00

(52) U.S. Cl. ...................... 345/847; 345/775; 345/809; 345/853; 707/205

(58) Field of Search ................................ 345/765, 775, 345/809, 810, 846, 847, 853, 349; 395/800, 383; 707/1–10, 203, 204, 205, 511, 516

(56) References Cited

U.S. PATENT DOCUMENTS

| | | | | |
|---|---|---|---|---|
| 5,731,813 A | * | 3/1998 | O'Rourke et al. | 345/349 |
| 5,771,384 A | * | 6/1998 | Remington et al. | 395/383 |
| 5,832,287 A | * | 11/1998 | Atalla | 395/800 |
| 5,936,624 A | * | 8/1999 | Lisle et al. | 345/845 |

OTHER PUBLICATIONS

Alan Simpson, Windows 95 Uncut, IDG Books Worldwide inc., 1995, pp. 8,57–65,241–251,578–579,771.*
Mosely et al., Mastering Microsoft Office 97, Sybex, pp. 24–26, 238–240, 358–359,759, 1997.*
M. Morris Mano, Computer Engineering: Hardware Design, pp. 1–3.*
Robert Cowart, Mastering Windows 95, pp. 49–55, 227–234 and 934–937.*

* cited by examiner

Primary Examiner—Ba Huynh
(74) Attorney, Agent, or Firm—Christensen O'Connor Johnson Kindness PLLC

(57) ABSTRACT

Conventional computer systems include numerous application programs which by default store files, or documents, in folders containing the application program that creates them. For example, wordprocessing documents are stored by default in the folder with the wordprocessing application program, and so forth. Thus, users who choose not to organize their documents according to subject matter or other criteria end up having their documents dispersed across numerous application-program folders, sometimes making them difficult to find. Accordingly, the inventors devised a computer operating system that defines a common default document folder for application programs. Moreover, to promote use of the default document folder, one embodiment of the operating system includes a graphical user interface which provides links, that is, one-button access to the common default folder, at file access points, such as in file-open and file-save dialog boxes accessed by the application programs.

17 Claims, 10 Drawing Sheets

COMPUTER OPERATING SYSTEM THAT DEFINES DEFAULT DOCUMENT FOLDER FOR APPLICATION PROGRAMS

TECHNICAL FIELD

This invention concerns computers, particularly the file management aspects of computer operating systems.

BACKGROUND OF THE INVENTION

Personal computers allow users to do an almost unlimited number of tasks. Examples of typical tasks include drafting term papers, resumes, and letters, organizing recipes and addresses, tracking personal checking accounts and stock portfolios, communicating via electronic mail with other computer users, generating blueprints for home improvements, and even making electronic photo albums. To accomplish these and other tasks, the typical computer system includes application programs—specific sets of instructions—that work with other components of the computer system to provide specific functions, such as word processing. Application programs are often called software to distinguish from the physical equipment, or hardware, of the computer system.

More particularly, the typical computer includes a central processing unit, a memory, a set of user-interface devices, and a display. The processing unit generally performs the computations and other data manipulations for performing, or executing, the instructions of application programs. The memory, which may take a variety forms such as a memory chip or a floppy disk, stores the application programs as well as data generated using the programs. User-interface devices, such as the keyboard and mouse, allow the user to input information into the application programs. For example, a user may input words or commands into the application program by typing on a keyboard, or select options from menus using a mouse or other pointing device. The display, sometimes called a monitor, not only provides a visible representation of application program operations, but also cooperates with the keyboard and mouse to provide a graphical user interface for intuitively interacting with and controlling application programs.

The typical computer system also includes an operating system—a special kind of software that coordinates or facilitates execution of application programs. Application programs logically combine functions or services of the operating system with those of the central processor to achieve more complex functions, such as word processing. Examples of typical operating-system functions include transferring data between the central processing unit and the memory, initial processing of inputs from the keyboard and mouse, managing the storage and retrieval of files in memory, and displaying graphical-user-interface menus and dialog windows. Operating-system functions relating to file storage and retrieval are generally said to constitute a file, or document, management system. In one sense, the file management system is the heart of the computer system, since a great majority of the tasks that users use computers for involve creating, storing, and retrieving documents of various types from memory. (The terms file and document are used interchangeably throughout this patent to broadly encompass any form of electronically stored information.)

The file management system usually organizes the memory of the computer system as a file cabinet comprising a number of folders, with each folder comprising one or more documents. Each application program typically has its own folder which stores the application program itself and the documents created using the application program. The file management system includes features which allow users to define their own folders and to logically group documents according to subject matter, date-of-creation, indeed any criteria they choose. However, because using these features requires extra effort and attention, a great many users allow the application programs to store their documents in the folders containing the applications used to create them. For example, many users allow the word processing application to store their documents in the word processing folder, the photograph-editing application to store its documents in the photo-editing folder, and so forth.

This approach of allowing separate application programs to store documents in their own folders ultimately scatters the users documents across numerous folders. Many of these folders have abbreviated and hard-to-remember names which at times make it difficult for users, who forget which application programs were used to create which documents, to find specific documents without considerable frustration and effort.

One partial solution to this problem entailed programming a family of four application programs, to store, or save, their documents to a common folder, unless users specified otherwise. In other words, the suite of four application programs were programmed to use a common default folder, instead of the four different folders containing the applications programs. A commercial example of this approach is the Office 95 (tm) family of business software from Microsoft Corporation of Redmond, Wash. This software family included application programs for word processing, spread sheeting, desktop publishing, and information management, all of which were programmed to save documents by default, that is, unless otherwise instructed, to a folder named My Documents.

However, this approach to default document storage applied only to application programs in the software family, not to the many other application programs that a typical computer system includes. Moreover, it did nothing to provide users with more convenient, straightforward access to the default folder, which can be difficult to find among a large number of folders. Accordingly, there is a need not only for a more general approach to default document storage, but also for more convenient ways of accessing the default folder.

SUMMARY OF THE INVENTION

To address these and other problems, the inventors devised an operating system which, rather than relying on application programs to set a common folder for default document storage, provides a common default folder to all application programs using the operating system. Moreover, for convenient access to the common default folder, some forms of the operating system include a graphical user interface which provides one-button access to the default folder at the highest level of the interface, eliminating the need for users to search through a hierarchical list of folders for the default folder. Additionally, other versions of the operating system includes a service that not only provide a list of most-recently-used documents but also one-button access to the common default folder. And still other versions of the operating system include a document sending feature that allows users to send any document, for example, an electronic mail message, to the default folder, and a document finding feature that allows users to focus computerized, document-searching efforts on the default document directory to save time.

The present invention encompasses systems, operating systems, computers, methods, and computer-readable media of varying scope. In addition to the aspects and advantages of the present invention described in this summary, further aspects and advantages of the invention will become apparent in view of the drawings and detailed description that follows.

DETAILED DESCRIPTION OF THE INVENTION

The following detailed description, which references and incorporates FIGS. 1A–4E, describes and illustrates one or more exemplary embodiments of the invention. These embodiments, offered not to limit but only to exemplify and teach the invention, are shown and described in sufficient detail to enable those skilled in the art to practice the invention. Thus, where appropriate to avoid obscuring the invention, the description may omit certain information known to those of skill in the art.

Overview

In the context of a computer system, the invention concerns document-management interactions among an operating system, one or more application programs, and a user-interface which allows users to view and enter data into the computer system. More particularly, the operating system takes advantage of normal interactions with application programs during access to basic file open and file save functions to present a common default storage folder called My Documents to the application programs. In addition, the operating system promotes further use of the My Documents folder at other file-access points in its graphical user interface. Another set of inventive features relate to using the My Documents folder in a network environment to facilitate the sharing of documents between users of different computer system.

Exemplary Computer System Embodying the Invention

Figure 1A:
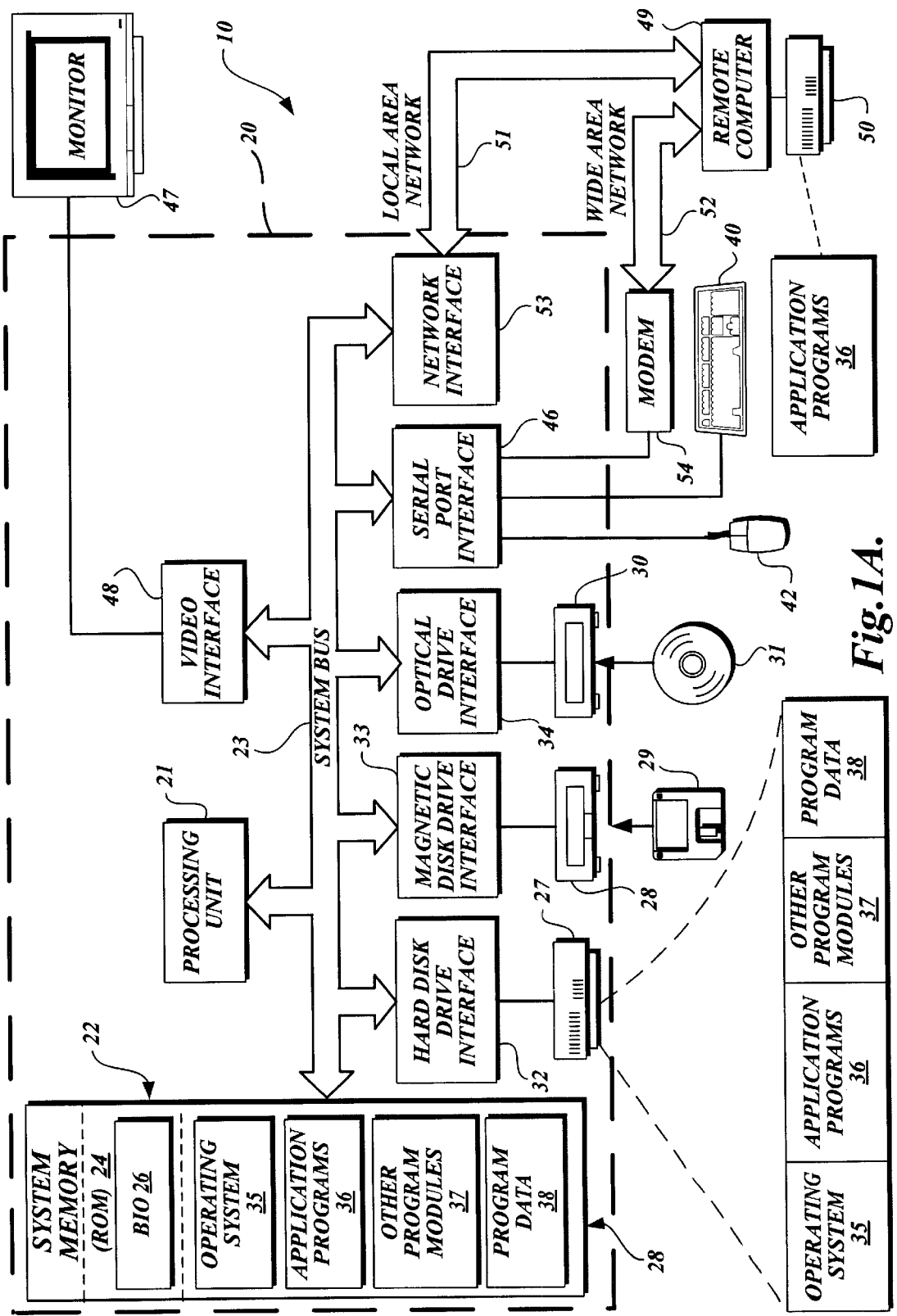
FIG. 1A is a block diagram of an exemplary computer system 10 embodying the invention.

FIG. 1A shows an exemplary computer system 10 which embodies the invention. The following description of system 10 is intended to provide a brief, general description of suitable computer hardware and a suitable computing environment in which the invention can be implemented. Although not required, the invention is described in the general context of computer-executable instructions, such as program modules, being executed by a computer, such as a personal computer. Generally, program modules include routines, programs, objects, components, data structures, and so forth, that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. The invention may also be practiced in distributed computing environments where tasks are performed by remote processing devices linked through a communications network. In a distributed computing environment, program modules may be located in both local and remote memory storage devices.

More particularly, computer system 10 includes a general purpose computing device in the form of a computer 20, including a processing unit 21, a system memory 22, and a system bus 23 that operatively couples various system components including the system memory to processing unit 21. There may be only one or there may be more than one processing unit 21, such that the processor of computer 20 comprises a single central-processing unit (CPU), or a plurality of processing units, commonly referred to as a parallel processing environment. Computer 20 may be a conventional computer, a distributed computer, or any other type of computer. Thus, the invention is not limited to a particular computer.

System bus 23 may be any of several types of bus structures including a memory bus or memory controller, a peripheral bus, and a local bus using any of a variety of bus architectures. The system memory, which may also be referred to as simply the memory, includes a read only memory (ROM) 24,and a random access memory (RAM) 25. ROM 24 stores a basic input/output system (BIOS) 26 containing the basic routines that help to transfer information between elements within the computer 20, such as during start-up. Computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

Hard disk drive 27, magnetic disk drive 28, and optical disk drive 30 are connected to system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for computer 20. It should be appreciated by those skilled in the art that any type of computer-readable media which can store data accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. Operating system 35 provides numerous basic functions and services to application programs 36 stored by system memory 22, hard-disk drive 27, and/or hard-disk drive 50. The invention, however, is not limited to a particular operating-system type or architecture. Indeed, the invention can be incorporated in any number of existing operating systems, such as the Microsoft Windows 95 operating system, the Microsoft Windows NT 4.0 operating system, the IBM OS/2 operating system, and the Apple Computer MacOS operating system.

Figure 1B:
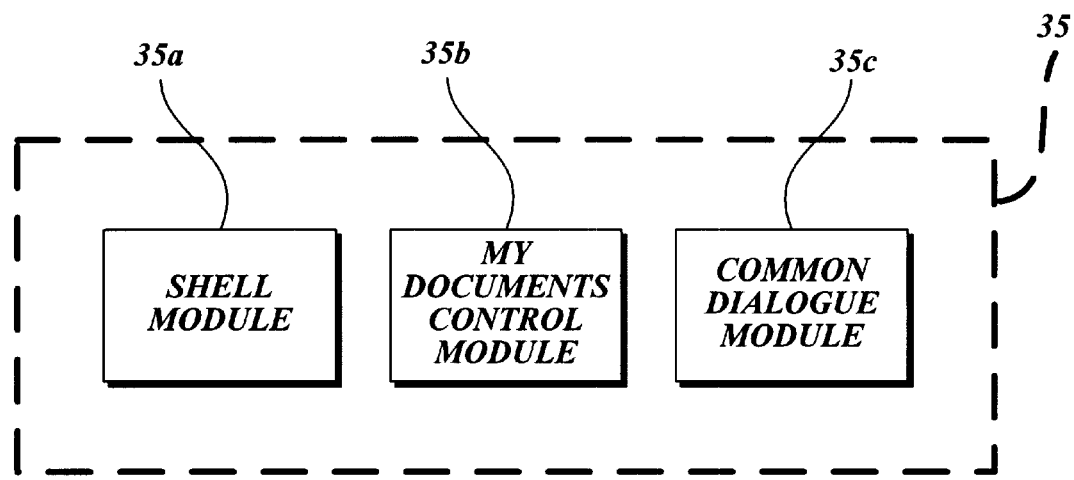
FIG. 1B is a partial block diagram of operating system 35 in computer system 10.

FIG. 1B, a partial block diagram, shows that exemplary operating system 35 includes three modules 35a, 35b, and 35c which perform the primary functions of the invention, that is to define and promote a common default storage container for application programs 36. The embodiment of FIG. 1B specifically contemplates versions of the Microsoft Windows operating system, such as Windows 95, Windows 98, and Windows NT operating systems. Module 35a provides shell, or interface, functions between the application programs and various portions of operating system 35. Module 35a is a standard part of versions of the Microsoft Windows operating system, according to one embodiment of the invention, and embodiments of the invention utilizing this module modify the module to provide functionality that is described in later sections of the detailed description. Module 35b includes most of the program instructions related specifically to promoting the My Documents folder as a default document storage container. And, module 35c defines and controls common dialog windows, such as the file-open and file-save dialog windows typically accessed by application programs. Module 35c is also a standard part of versions of the Microsoft Windows operating system, according to one embodiment of the invention, and embodiments of the invention utilizing this module also modify the module to provide functionality that is described in later sections of the detailed description. However, the invention is not limited to any particular division of functions.

Additionally, the invention is not limited any particular set or number of application programs 36. Examples of some applications the invention can be used with include the Microsoft Word word processing software, Microsoft Excel spreadsheet software, Microsoft Outlook information management software, Microsoft Publisher desktop-publishing software, and Microsoft Internet Explorer to name a few. These are available from Microsoft Corporation of Redmond, Wash. Other exemplary application programs include the Quarterdeck drawing program HijaakPro and Micrografx drawing programs: ABC Flowcharter, Designer, and Picture Publisher.

A user may enter commands and information into personal computer 20 through input devices such as a keyboard 40 and pointing device 42. Other input devices (not shown) may include a microphone, joystick, game pad, satellite dish, scanner, or the like. These and other input devices are often connected to processing unit 21 through a serial port interface 46 that is coupled to the system bus, but may be connected by other interfaces, such as a parallel port, game port, or a universal serial bus (USB). A monitor 47 or other type of display device is also connected to system bus 23 via an interface, such as a video adapter 48. In addition to the monitor, computers typically include other peripheral output devices (not shown), such as speakers and printers.

Computer 20 may operate in a networked environment using logical connections to one or more remote computers, such as remote computer 49. These logical connections are achieved by a communication device coupled to or a part of the computer 20. However, the invention is not limited to a particular type of communications device. Remote computer 49, which may be another computer, a server, a router, a network personal computer (PC), a client, a peer device or other common network node, typically includes many or all of the elements of computer 20, although FIG. 1 only shows a memory storage device 50. The logical connections depicted in FIG. 1 include a local-area network (LAN) 51 and a wide-area network (WAN) 52. Such networking environments are commonplace in offices, enterprise-wide computer networks, intranets and the Internet.

When used in a LAN-networking environment, computer 20 is connected to the local network 51 through a network interface or adapter 53, which is one type of communications device. When used in a WAN-networking environment, computer 20 typically includes a modem 54, a type of communications device, or any other type of communications device for establishing communications over wide area network 52, such as the Internet. Modem 54, which may be internal or external, is connected to system bus 23 via serial port interface 46. In a networked environment, program modules depicted relative to personal computer 20, or portions thereof, may be stored in the remote memory storage device. It is appreciated that the network connections shown are exemplary and other means of and communications devices for establishing a communications link between the computers may be used.

The exemplary computer may be a conventional computer, a distributed computer, or any other type of computer, since the invention is not limited to any particular computer. A distributed computer typically includes one or more processing units as its processor, and a computer-readable medium such as a memory. The computer may also include a communications device such as a network adapter or a modem, so that it is able to communicatively couple with other computers to form a computer network.

Operation of the Exemplary Computer System

This embodiment of the invention primarily concerns interactions among operating system 35, application programs 36, mouse 42, and monitor 47, particularly document management aspects of operating system 35. In general, operating system 35 provides a common default folder (or directory)—named My Documents—to application programs 36 and thus makes it easy for a user to consolidate document storage for these application program into a single folder, rather than in the numerous folders which contain the application programs. The embodiment of the invention described in this section of the detailed description relates specifically to versions of the Microsoft Windows operating system; however, the invention is not so limited.

Figure 2A:
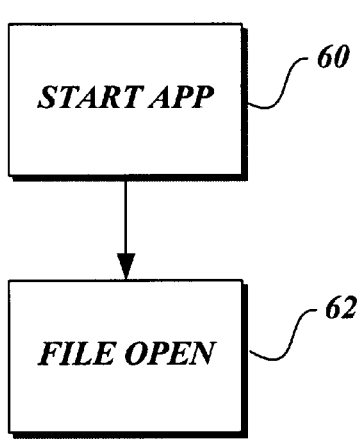
FIG. 2A is a flowchart illustrating an exemplary method of the present invention, in which operating system 35 of system 20 defines a folder named My Documents folder as the common default folder for application programs 36 in system 10.

FIG. 2A shows an exemplary method of operating computer system 10. In particular, the method begins at step 60 with a user starting one of application programs 36, for example the Microsoft Paint application program. Step 60 occurs under the assumption that computer system 10 has already been appropriately booted and so forth.

Figure 3A:
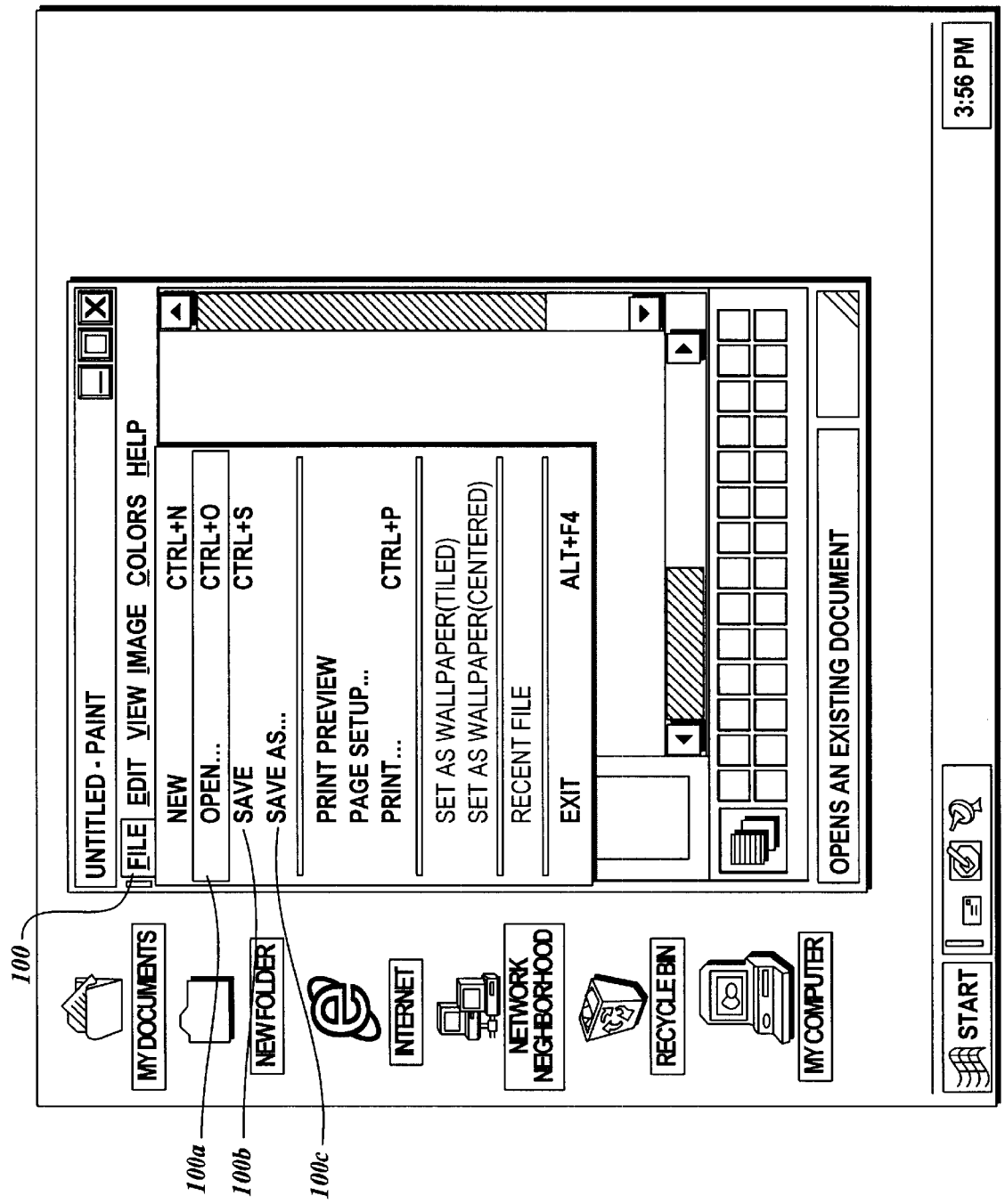
FIG. 3A is an illustration of a file menu displayed during execution of the FIG. 2A method.
Figure 3B:
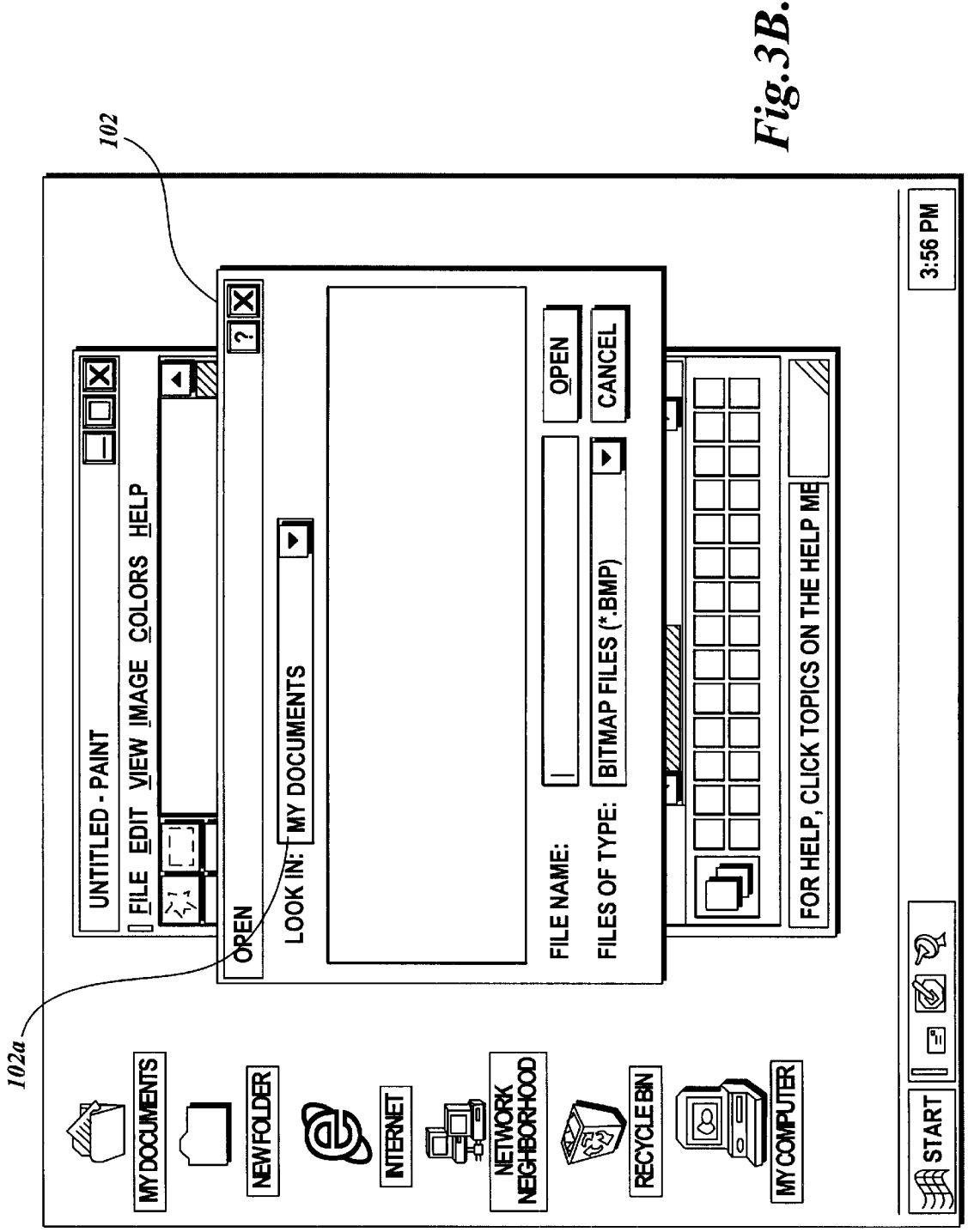
FIG. 3B is an illustration of a file-open dialog window displayed during execution of the FIG. 2A method.

In step 62, the user selects a file command menu 100 and file open option 100a as shown in FIG. 3A. In this exemplary embodiment, the user selects the file open option using mouse 42 to highlight and click on field 100a, which is labeled Open. In response, operating system 35, namely module 35c which generally defines common dialog windows (or boxes), presents a file-open dialog window 102 as shown in FIG. 3B. FIG. 3B illustrates one example of the unlimited number of forms that file-open dialog window 102 can take. File-open dialog window 102 includes a look-in field 102a which by default specifies the My Documents folder.

Figure 2B:
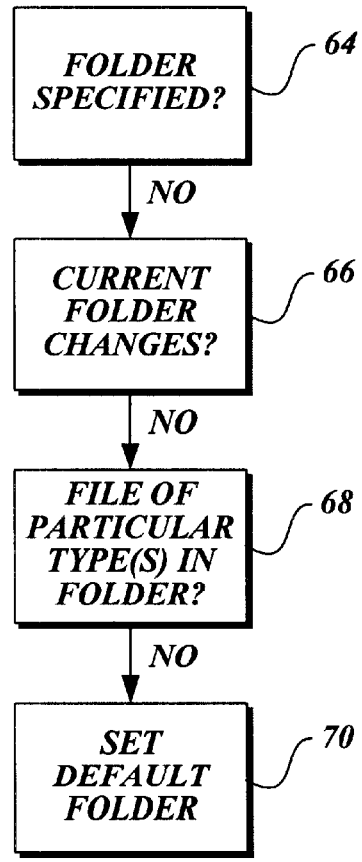
FIG. 2B is a flowchart illustrating an exemplary algorithm used with the method of FIG. 2A.

However, before actually presenting the My Documents folder as a default document storage option to the user via the graphical user interface, the exemplary embodiment of a operating system 35 determines whether presenting My Documents would override or conflict with another definition of a default document storage folder for the application program. FIG. 2B illustrates an algorithm of module 35b which makes this determination. The algorithm begins with step 64 with module 35b determining whether the application program specified a folder other than the My Documents folder during selection of the file open dialog window. If the application program specified a folder, then module 35c of operating system 35 causes monitor 47 to display an label for that folder in look-in field 102a of window 102. However, if the application program did not specify a different folder, module 35b proceeds to step 66.

In step 66, module 35b determines whether the application program has changed the current folder since (the last time) the file-open dialog window was invoked. If the current folder has changed, module 35b treats the new current file folder as the default document storage folder for the application program and displays it in look-in field 102a. However, if there has been no change in the current folder, module 35b executes step 68.

In step 68, module 35b determines whether any documents in the current file folder, which is typically the folder containing the application program, meet the document-type requirements of the application program. In the exemplary embodiment this entails scanning the current document folder for documents having particular suffixes, or extensions, appended to their names. (Examples of extensions include "doc," "txt," and "bmp"). If any documents in the current document folder match the extension(s) specified by the application program, module 35b treats the current folder as the default folder and presents its name in look-in field 102a. However, if none are found, module 35b of operating system 35 proceeds to step 70, in which it presents My Documents as the default document folder for the application program, by presenting it in look-in field 102a.

In the case of file save for a new document or a saving of a document under a new name, one would invoke save option 100b or save-as option 100c of file menu 100 in FIG. 3A. In either case, operating system 35, specifically module 35c, would cause monitor 47 to display a file-save dialog window, such as window 104 in FIG. 3C, which presents the My Documents folder as a default document storage container in save-in field 104a. One should appreciate however that exemplary operating system 35 follows the same procedure outlined in FIG. 2B to avoid contradicting another definition of a default document storage folder for the application program.

Although the method described above and illustrated in FIGS. 2A and 2B is straightforward for those of ordinary skill, one should appreciate that the subtleties of particular operating-system modules and architectures in relation to specific application programs, may require special attention. For example, in the exemplary implementation, it was useful, though not essential, to enhance the shell or other program modules of the Microsoft Windows 95 operating system—as recited in the previous section of the detailed description—to handle some special-case, or non-conforming, application programs.

Specifically, it is useful to keep a list of special-case application programs. Such programs include, for example, the Lotus Wordpro program, and the 1995 and 1997 versions of the Microsoft Word, Access, Powerpoint, and Binder programs. In this highly particular implementation of the invention, module 35b include instructions to check the window-class name of the calling application program (that is, the application calling for a common file dialog window) against the list of special-case applications. If the calling application program is on the list, module 35b returns what would otherwise be incorrect results or data to the application to work around bad assumptions or "bugs" in the application programs, thereby allowing the operating system to specify the My Documents folder as the default document storage container for that application program.

Relatedly, the shell is also enhanced in one specific embodiment of the invention to allow a shell extension to be queried for attributes and parsing information which had previously been static declarations in the shell registry. In the prior art, the shell only allows shell extension attributes to be statically specified in the registry. Additionally, for the RegItems listed in the registry, as such items are known within the art, all work for the IShellFolder::GetDisplayNameOf function is done by the shell for the SFGAO_FORPARSING flag. The shell is changed to allow the shell extension to specify not only that it wants to be called for its attributes dynamically, but also that it wants to handle the IShellFolder::GetDisplayNameOf call, as also known in the art. Without these changes, it is generally more difficult to operate this implementation of the invention with the special-case applications.

Convenient Access to the My Documents Default Storage Folder

Figure 4A:
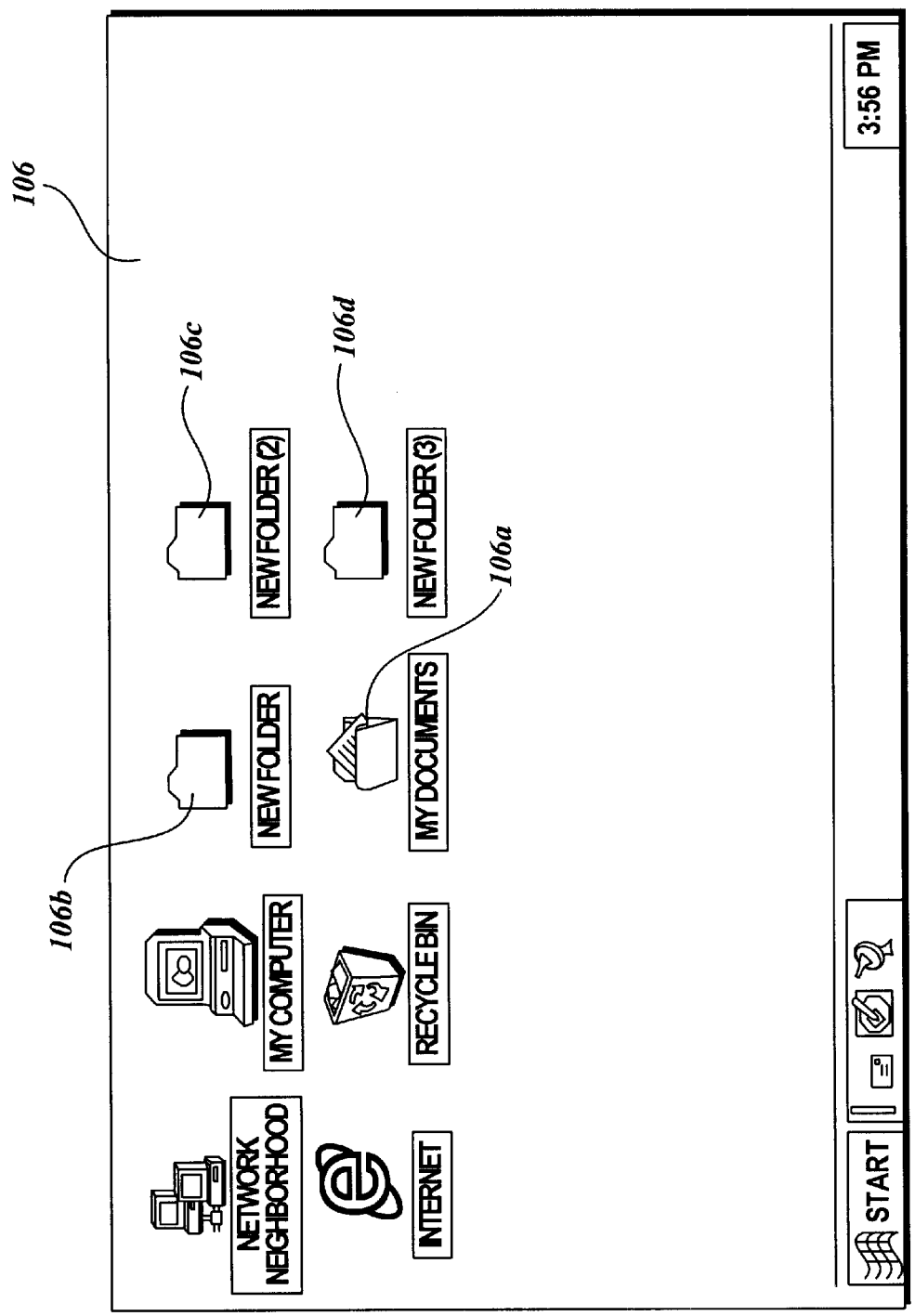
FIG. 4A is an illustration of a desktop in a graphical user interface of operating system 35, including a link to the default file-storage container named My Document.

Another facet of the invention promotes use of the My Documents folder by presenting it as a user-selectable option at various file access points in the graphical-user-interface of operating system 35. The embodiments of the invention described in this section of the detailed description also relate specifically to versions of the Microsoft Windows operating system; however, the invention itself is not so limited. As FIG. 4A shows, one way to promote use of the My Documents folders is to insert an icon 106a for the My Documents folder at the highest or most visible level of the graphical user interface, that is, on the metaphorical desktop, denoted 106. Moreover, icon 106a has a unique appearance which distinguishes from other folder icons 106b, 106c, and 106d on the desktop and throughout the graphical user interface. In particular, icon 106a is a perspective view of a partially open file folder with a text-bearing document inside, with the file, document, and text being of different colors. In constrast, conventional folder icons 106b–d provide only side views of closed folders.

Figure 3C:
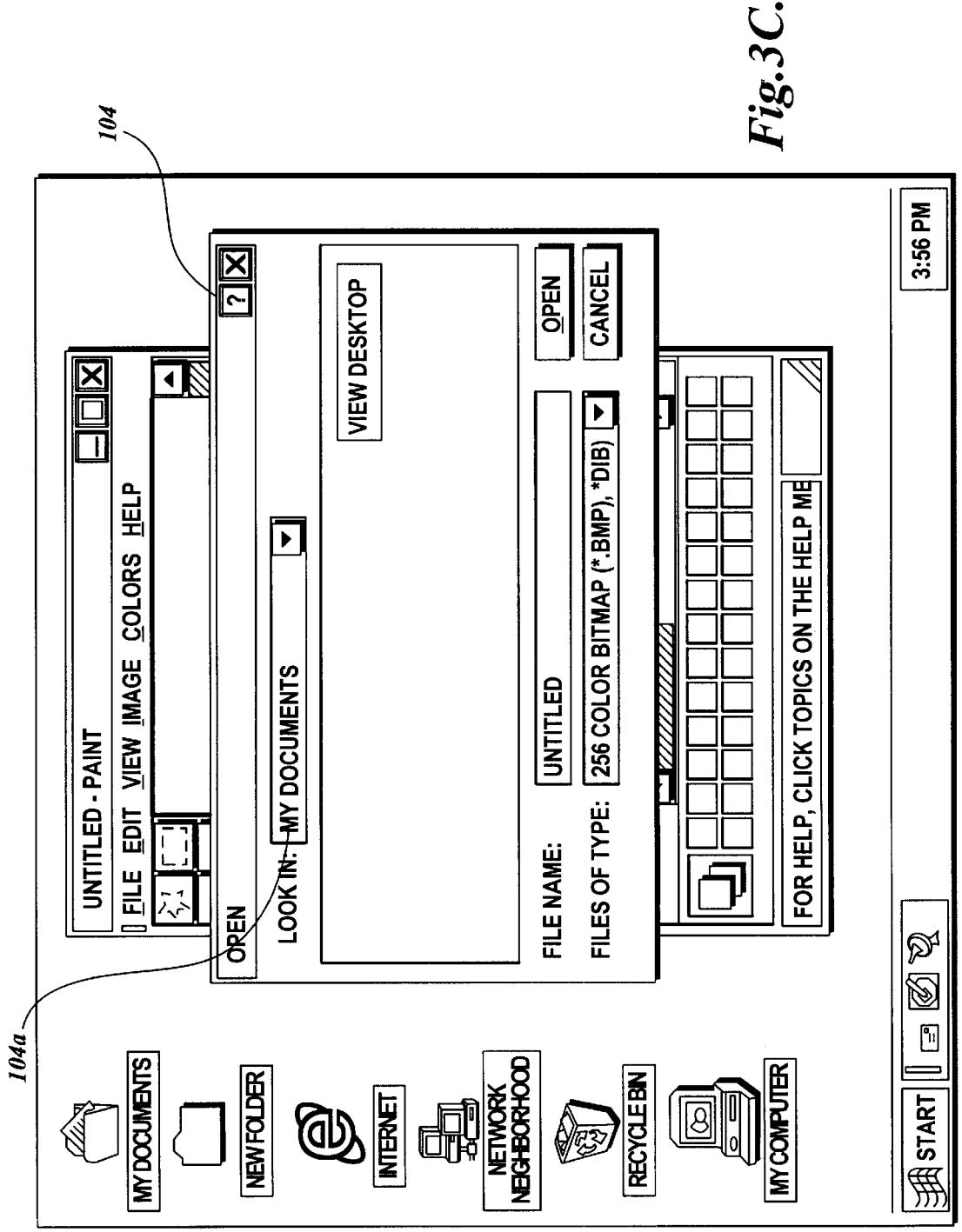
FIG. 3C is an illustration of a file-save dialog window displayed during execution of the FIG. 2A method.
Figure 4B:
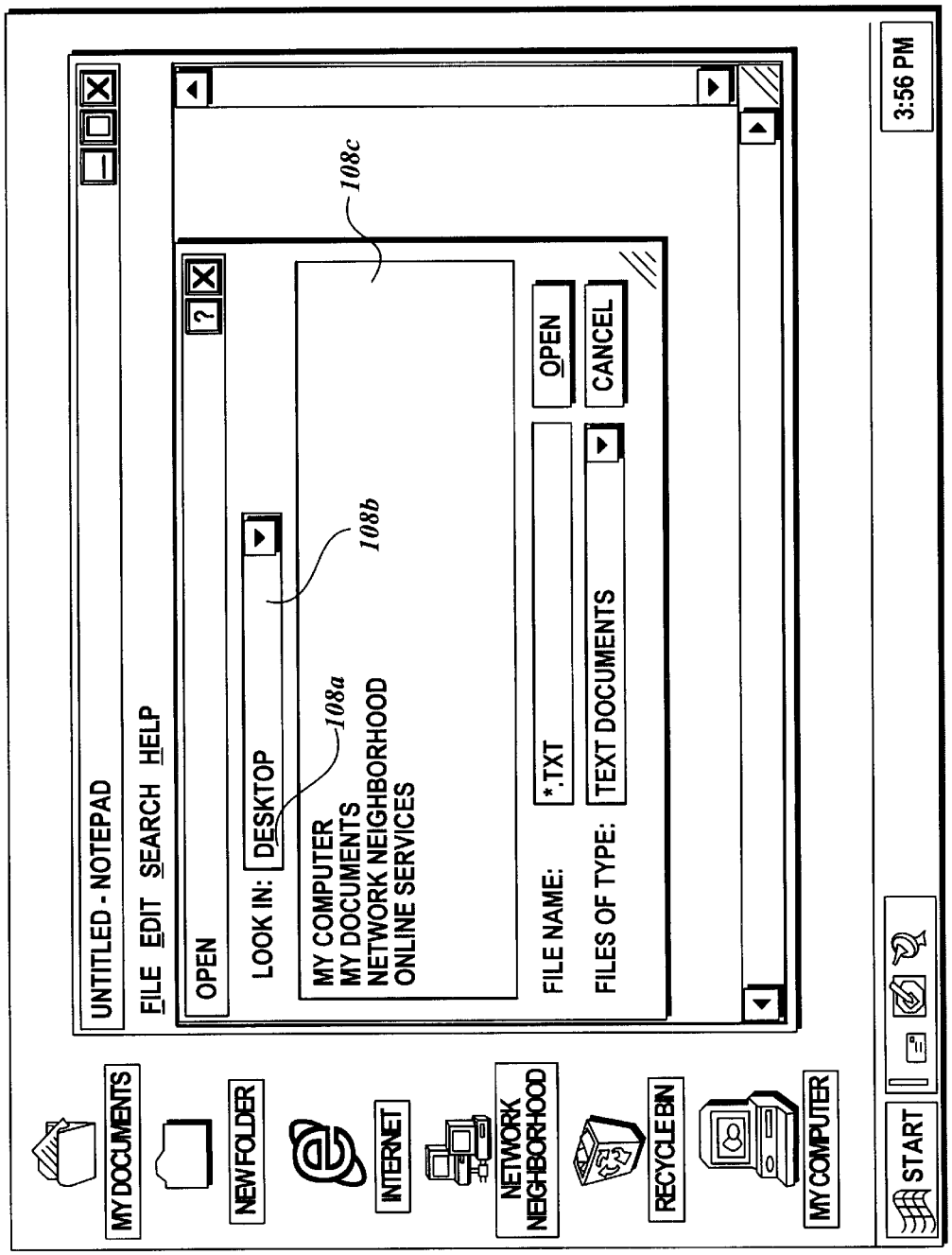
FIG. 4B is an illustration of file-open dialog window including a link to the desktop of the graphical user interface.

FIG. 4B shows a second way. Specifically, FIG. 4B shows a common file-open dialog window 108 which includes a selectable desktop icon 108a. The figure also illustrates that selecting the icon not only causes operating system 35 to display the icon and the label desktop cause in a look-in field 108b, but also to display links to desktop-document-storage containers in field 108c. In addition to a link to the My Documents folder, these include links to the My Computer folder, the Network Neighborhood container, and an On-line Services container. (The invention also encompasses the inclusion of the desktop icon on other common file-access windows, such as file-save window as shown in FIG. 3C.) In one sense, this feature gives users who may at times become disoriented in the graphical user interface a easy way of returning to the familiar territory of the desktop.

Figure 4C:
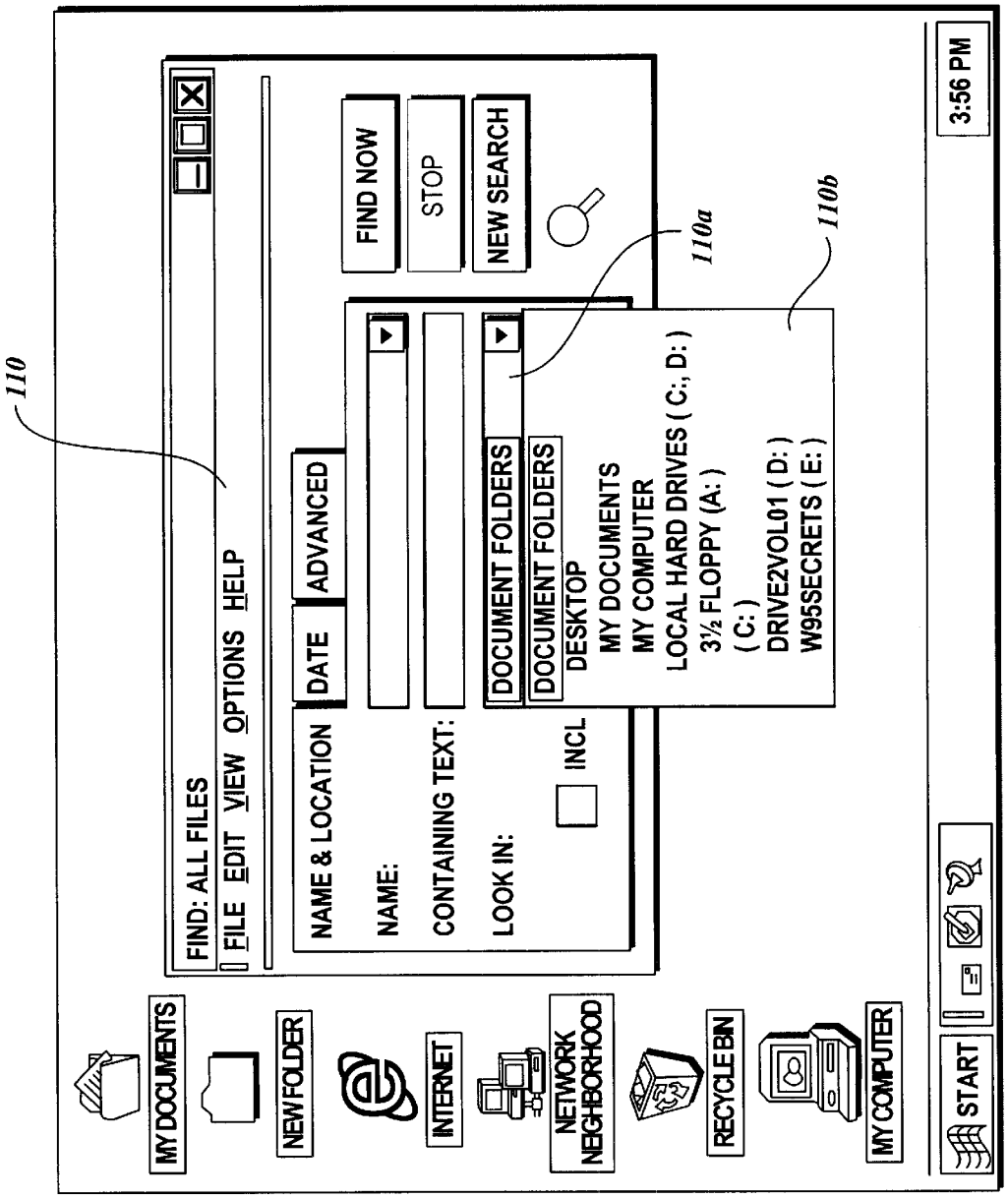
FIG. 4C is an illustration of a dialog window for a file find service of operating system 35, presenting several search options including to search for files or folders.

FIG. 4C shows that a third way of providing convenient access to the My Documents default storage folder integrates the My Documents folder into a file finding feature of operating system 35. More particularly, FIG. 4C shows a find dialog window 110 which includes a look-in field 110a for targeting search to particular containers. Further, window 110 includes a browse button (hidden in this view) and a pull-down options menu 110b with predetermined options for look-in field 110a. Among the options on menu 110b is an option for a Document Folders container which includes a link not only to the desktop (106 in FIG. 4A) but also a link to the My Documents folder.

Figure 4D:
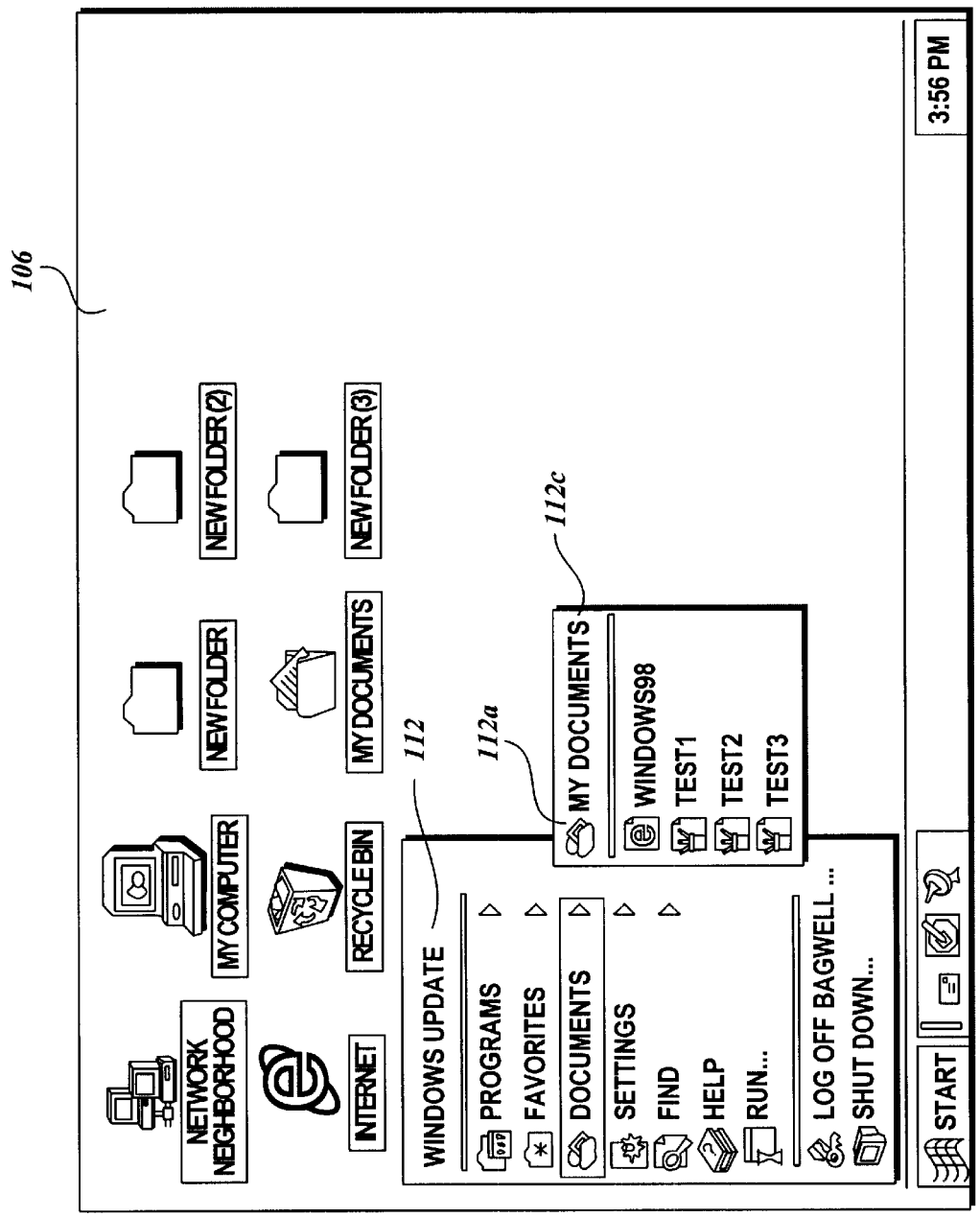
FIG. 4D is an illustration of a file menu in the graphical user interface, including a list of most-recently-used files and a link to the default file-storage container My Documents.

A fourth way of providing convenient access to the My Documents folder is to provide a link the folder in a list of most-recently-used documents. For example, FIG. 4D shows a Start menu 112 which has been invoked on desktop 106 to show a Documents submenu 112a. A section 112b of the submenu. includes a list of most-recently-used documents which includes a link 112c to the My Documents folder. Thus, if the list lacks a particular documents that a user wants to access, the user may easily check the My Documents folder for it. In addition, this most-recently-used documents feature is also included within a file-open dialog window. Those of skill in the art, however, will understand that this augmented most-recently-used documents list may be placed anywhere in the graphical user interface. (An extension to this approach is to supplement or substitute the list of most-recently-used documents with a list of most-recently-accessed document folders.)

Figure 4E:
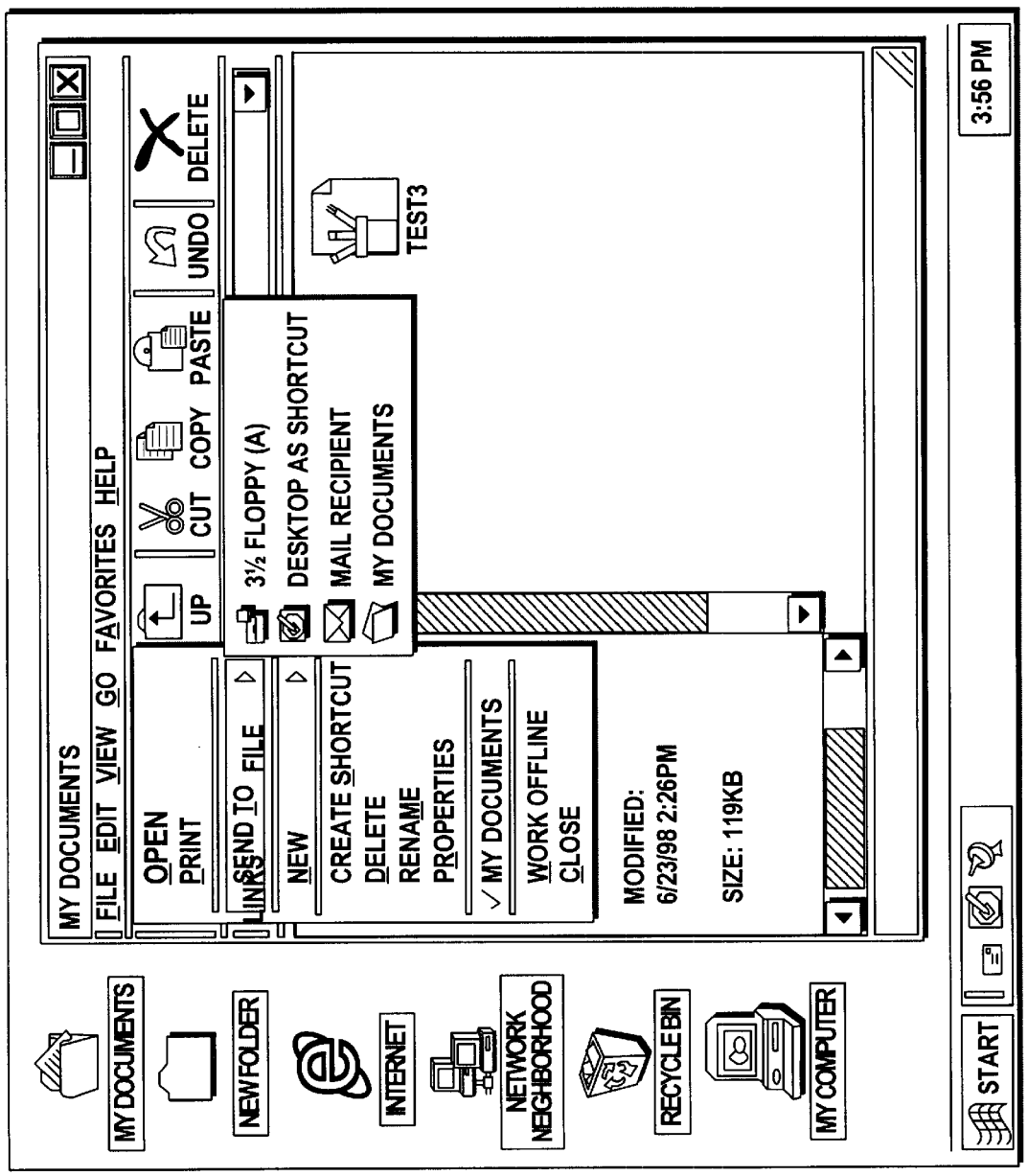
FIG. 4E is an illustration of a file menu with a file send function and an associated submenu with a link to the My Documents default file-storage container.

A fifth way is to incorporate a link to the My Documents folder in a file send feature as shown in FIG. 4E. This figure shows a Send To menu with an option to send a file to a floppy disk drive, to the desktop, to a mail recipient, or to the My Documents folder.

Two Uses of My Documents Default Storage Folder in Network Environments

One computer-network application of the My Documents folder allows network administrators more flexibility in maintaining links to document shares for users. Within the prior art, to maintain links to shared documents in a network, a network administrator would has to insert special link files, known as short cuts in versions of the Microsoft Windows operating systems, on all the computers of all the users within a computer network. This is a time consuming process. For example, when a new shared destination is desired for all the users on a project, the network administrator has to manually save shortcuts to this destination on all the users' computers. To overcome this problem, exemplary operating system 35, specifically module 35b, looks in the shell registry for these pointers instead of in files. As those of ordinary skill within the art can appreciate, the registry is easily updated remotely, over a network, instead of having to physically go to each person's computer.

Another network aspect of the invention allows a network administrator to set and control the target of the default-storage folder, in other words, the storage device or devices or portions of these devices which actually store the contents of the folder. (These storage devices may be network or local storage devices.) Within the prior art, a short cut file typically specifies the target, or destination folder, such that the link to this folder cannot be easily changed; the administrator may have to physically go to a user's computer, delete the old short cut file, and create a new short cut file when the destination related to the short cut file changes.

One way of overcoming this problem is to store the target of each user's My Documents folder, or any other destination folder, in the shell registry of the user's operating system. The network administrator can then update the shell registry two ways: first, by updating a centralized network user registry which is propagated upon log-in to a user's shell registry; and second by simply "reaching into" and modifying the user's local shell registry. In both cases, the administrator can easily change or update the target for each user without any user intervention.

For example, when the destination folder changes from being on a hard disk drive specified by a drive letter "h:" to another hard disk drive specified by a drive letter "j:," the administrator only has to use available network administration tools to change the registry of each user's computer to reflect this change via the My Documents folder, instead of having to manually go to each user's computer and arranging for a new short cut file.

Conclusion

In furtherance of the art, the inventors have presented an operating system which provides a common default storage folder for one or more application programs in a computer system. In addition, the inventors provided the operating system with a graphical user interface that includes several conveniently placed links to the common default storage folder. The embodiments described above are intended only to illustrate and teach one or more ways of practicing or implementing the present invention, not to restrict its breadth or scope. The actual scope of the invention, which embraces all ways of practicing or implementing the concepts of the invention, is defined only by the following claims and their equivalents.

What is claimed is:

1. A graphical user interface for a computer, comprising:
   a screen;
   a predetermined file-container icon displayed on the screen;
   one or more registered or unregistered application programs; and
   one or more operating system provided file-operation dialog boxes accessed by any of said one or more registered or unregistered application programs when any of said one or more registered or unregistered application programs are executed, wherein said operating system provided file-operation dialog boxes are defined independently of the one or more application programs to specify a file containers associated with the predetermined file-container icon as a default document container for files related to the one or more application programs.

2. The graphical user interface of claim 1, further comprising a destination menu item associated with a file to permit the file to be moved or copied to the file container associated with the file-container icon.

3. The graphical user interface of claim 1, wherein the predetermined file-container icon has an associated name "My Documents."

4. The graphical user interface of claim 1, wherein one or more of the operating system provided file-operation dialog boxes are associated with a file open or file save operation.

5. The graphical user interface of claim 1, wherein the computer is running a version of the Microsoft Windows operating system.

6. A computerized system comprising:

a predetermined file-storage container;

one or more registered or unregistered application programs; and an operating system which defines the predetermined file-storage container as a default file-storage container on file-operation dialog windows when accessed by any of said one or more registered or unregistered application programs when any of said one or more registered or unregistered application programs are executed.

7. The computerized system of claim 6, further comprising a master file containing global information pertinent to the computer system, such that information regarding a physical storage device to which the predetermined file-storage container relates is stored therein.

8. The computerized system of claim 7, further comprising a shell registry which stores the master file.

9. The computerized system of claim 7, wherein the master file is accessible by a network administrator over a computer network of which the computerized system is a part such that the network administrator is able to change the information regarding the physical storage device over the network.

10. The computerized system of claim 6, wherein the operating system comprises a version of the Microsoft Windows operating system.

11. The computerized system of claim 6, wherein the predetermined file-storage container is named "My Documents."

12. A method of operating a computer system including one or more registered or unregistered applications and an operating system, the method comprising:

when any of said one or more registered or unregistered application programs are executed;

determining whether one of the applications has specifeid a folder for storing files related to the one application;

determining whether the one application has redirected file storage from the folder to a current folder; and determining whether files within the current folder are of one or more particular types; and setting a default for storing, files related to the one application, wherein the operating system sets the default folder, provided that the one application has not specified a folder, that the one application has not redirected file storage to the current folder, and that no file stored within the current folder is of the one or more particular types.

13. A computer comprising:

a processor;

a memory;

one or more registered or unregistered application programs; and an operation system executed by the processor from the memory to provide a predetermined file-storage folder as a default folder on file operation dialog boxes accessed by any of said one or more registered or unregistered application programs when any of said one or more registered or unregistered application programs are executed, wherein the file operation dialog boxes are defined independently of the application programs.

14. A computer-readable medium having an operating system stored thereon for execution on a computer to provide a predetermined file-storage folder as a default application programs when an of said one or more registered or unregistered application programs are executed, wherein the file operation dialog boxes are defined independently of the one or more computer application programs.

15. An operating system comprising one or more file-management modules defined to provide a default file-storage folder to one or more registered or unregistered application programs are executed, wherein the one or more file-management modules are defined independently of the one or more computer application programs.

16. An operating system comprising a graphical user interface which includes: a desktop that provides access to a predetermined file-storage container and to one or more registered or unregistered application programs; and one or more file-operations windows accessed by registered or unregistered application programs when any of said one or more register or unregistered application programs are executed, wherein each file-operations window includes a link to the desktop.

17. A computer system for executing one or more registered or unregistered applications and an operating system, the system comprising:

when any of said one or more registered or unregistered application programs are executed;

means for determining whether one of the applications has specified a folder for storing files related to the one application;

means for determining whether the one application has redirected file storage from the folder to a current folder;

means for determining whether files within the current folder are of one or more particular types; and operating system means for automatically setting a default folder for storing files related to the one application, provided that the one application has not specified a folder for storing files, that the application has nor redirected file storage to the current folder, and that no file stored within the current folder is of the one or more particular types.

* * * * *

UNITED STATES PATENT AND TRADEMARK OFFICE
CERTIFICATE OF CORRECTION

PATENT NO.    : 6,466,238 B1
DATED         : October 15, 2002
INVENTOR(S)   : J.R. Berry et al.

It is certified that error appears in the above-identified patent and that said Letters Patent is hereby corrected as shown below:

Column 7,
Line 18, "embodiment of a" should read -- embodiment of --

Column 9,
Line 31, "submenu. includes" should read -- submenu includes --

Column 10,
Line 60, "a file containers" should read -- a file container --

Column 11,
Line 47, "specifeid" should read -- specified --

Column 12,
Line 19, "application programs" should read -- folder on file operation dialog boxes accessed by one or more registered or unregistered application programs --
Line 19, "when an" should read -- when any --
Line 26, "application programs are executed," should read -- application programs when any of said one or more registered or unregistered application programs are executed, --
Line 35, "more register" should read -- more registered --
Line 55, "has nor" should read -- has not --

Signed and Sealed this

Twenty-ninth Day of April, 2003

JAMES E. ROGAN
*Director of the United States Patent and Trademark Office*

US006466238C1

(12) EX PARTE REEXAMINATION CERTIFICATE (8197th)
United States Patent
Berry et al.

(10) Number: US 6,466,238 C1
(45) Certificate Issued: May 3, 2011

(54) COMPUTER OPERATING SYSTEM THAT DEFINES DEFAULT DOCUMENT FOLDER FOR APPLICATION PROGRAMS

(75) Inventors: Jon R. Berry, Woodinville, WA (US); Robert F. Day, Bellevue, WA (US); Eric R. Flo, Issaquah, WA (US); Joseph H. Matthews, Woodinville, WA (US); Richard S. Turner, Jr., Woodinville, WA (US)

(73) Assignee: Microsoft Corporation, Redmond, WA (US)

Reexamination Request:
No. 90/009,078, Mar. 13, 2008

Reexamination Certificate for:
Patent No.: 6,466,238
Issued: Oct. 15, 2002
Appl. No.: 09/107,110
Filed: Jun. 30, 1998

Certificate of Correction issued Apr. 29, 2003.

(51) Int. Cl.
*G06F 9/44* (2006.01)

(52) U.S. Cl. ............................... 715/847; 707/999.205; 715/775; 715/809; 715/853

(58) Field of Classification Search .................. None
See application file for complete search history.

(56) References Cited

PUBLICATIONS

Lonnie E. Moseley et al. Mastering Office 97, Professional Edition, 2nd Ed. (Dec. 1996) pp. 5–7, 15–29, 237–240, 358–359, 526–531, 727, 728, 759–761, 1048–1058, Sybex, San Francisco ("Moseley").
Alan Simpson, Windows(R)95 Uncut, (1995), pp. 8, 46, 51, 57–65, 241–251, 431–534, 577–579, 771, IDG Books Worldwide, Foster City, CA. ("Simpson").
Robert Cowart, Mastering Windows(R)95, (1995), pp. 6, 7, 25–27, 33, 49–55, 72, 94, 121–137, 183, 184, 217–220, 227–234, 378, 379, 391, 392, 490, 491, 933–1038, Sybex, San Francisco ("Cowart").

*Primary Examiner*—Christopher E Lee

(57) ABSTRACT

Conventional computer systems include numerous application programs which by default store files, or documents, in folders containing the application program that creates them. For example, wordprocessing documents are stored by default in the folder with the wordprocessing application program, and so forth. Thus, users who choose not to organize their documents according to subject matter or other criteria end up having their documents dispersed across numerous application-program folders, sometimes making them difficult to find. Accordingly, the inventors devised a computer operating system that defines a common default document folder for application programs. Moreover, to promote use of the default document folder, one embodiment of the operating system includes a graphical user interface which provides links, that is, one-button access to the common default folder, at file access points, such as in file-open and file-save dialog boxes accessed by the application programs.

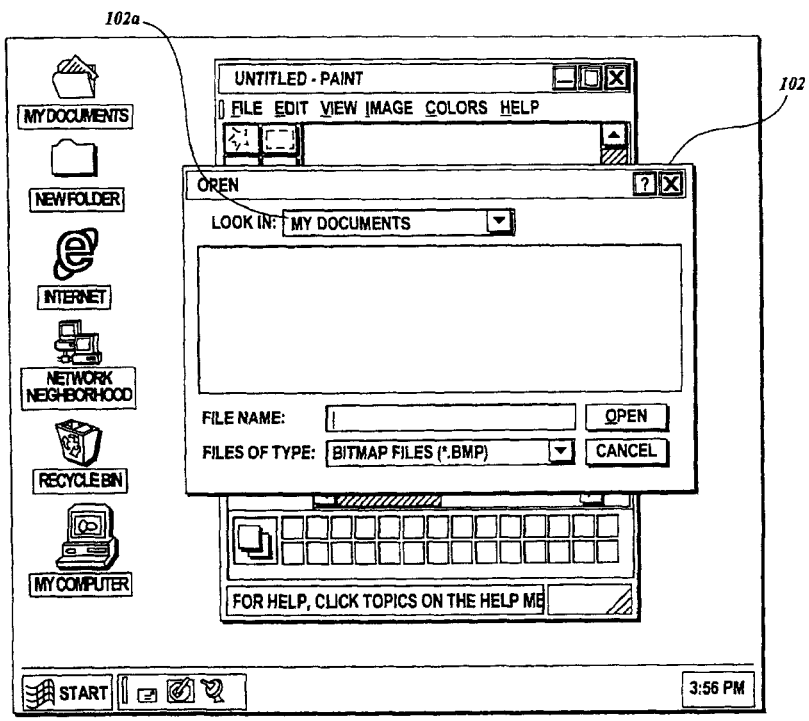

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 5 and 10 are cancelled.

Claims 1, 2, 6 and 12-17 are determined to be patentable as amended.

Claims 3, 4, 7-9 and 11, dependent on an amended claim, are determined to be patentable.

New claims 18-21 are added and determined to be patentable.

1. A graphical user interface for a computer, comprising:
a screen *displaying a desktop of the graphical user interface*;
a predetermined file-container icon displayed on the [screen] *desktop*;
one or more registered or unregistered application programs; and
one or more operating system provided file-operation dialog boxes accessed by any of said one or more registered or unregistered application programs when any of said one or more registered or unregistered application programs are executed, wherein said operating system provided file-operation dialog boxes are defined independently of the one or more application programs to specify a file container associated with the predetermined file-container icon as a default document container for files related to the one or more application programs, *wherein the default document container and the predetermined file-container icon are provided by the operating system independently of the one or more application programs*.

2. The graphical user interface of claim 1, further comprising a destination menu item *representing the default document container, wherein the destination menu item is* associated with a *"Send To" menu for a* file to permit the file to be moved or copied to the [file container associated with the file-container icon] *default document container*.

6. A computerized system comprising:
[a predetermined file-storage container;]
one or more registered or unregistered application programs; [and]
an operating system [which defines the] *providing a file-operation dialog window; and*
*a* predetermined file-storage container *provided by the operating system independently of the one or more registered or unregistered programs, wherein the operating system defines the predetermined file-storage container* as a default file-storage container on *the* file-operation dialog [windows] *window* when *the file-*
*operation dialog window is* accessed by any of said one or more registered or unregistered application programs when any of said one or more registered or unregistered application programs are executed.

12. A method of operating a computer system including one or more registered or unregistered [applications] *application programs* and an operating system, the method comprising:
*providing a predetermined file-storage container by the operating system independently of the one or more registered or unregistered application programs;*
when any of said one or more registered or unregistered application programs are executed[;]*:*
determining whether [one of the applications] *the executed application program* has specified a folder for storing files related to the [one] *executed* application *program*;
determining whether the [one] *executed* application has redirected file storage from the *specified* folder to a current folder; and
determining whether files within the current folder are of one or more particular types; and
setting a default *folder* for storing[,] files related to the [one] *executed* application *program*, wherein the operating system sets the default folder *to be the predetermined file-storage container*, provided that the [one] *executed* application *program* has not specified a folder *for storing files*, that the [one] *executed* application has not redirected file storage to the current folder, and that no file stored within the current folder is of the one or more particular types.

13. A computer comprising:
a processor;
a memory;
one or more registered or unregistered application programs; and
an [operation] *operating* system executed by the processor from the memory to provide *a file operation dialog box and* a predetermined file-storage folder, *the operating system defining the predetermined file-storage folder* as a default folder on *the* file operation dialog [boxes] *box when the file operation dialog box is* accessed by any of said one or more registered or unregistered application programs when any of said one or more registered or unregistered application programs are executed, wherein the *predetermined file-storage folder and the* file operation dialog [boxes] *box* are [defined] *provided by the operating system* independently of the application programs.

14. A computer-readable medium having an operating system stored thereon for execution on a computer to provide a predetermined file-storage folder as a default folder on file operation dialog boxes accessed by one or more registered or unregistered application programs when any of said one or more registered or unregistered application programs are executed, wherein the *predetermined file-storage folder and the* file operation dialog boxes are [defined] *provided by the operating system* independently of the one or more computer application programs.

15. An operating system comprising one or more file-management modules defined to provide a default file-storage folder to one or more registered or unregistered application programs when any of said one or more registered or unregistered application programs are executed, wherein the *default file-storage folder and the* one or more file-management modules are [defined] *provided by the operating system* independently of the one or more computer application programs.

16. An operating system comprising a graphical user interface which includes: a desktop that provides access to [a predetermined file-storage container and to] one or more registered or unregistered application programs; [and one or more file-operations windows]

*a predetermined file-container icon displayed on the desktop, wherein the predetermined file-container icon is associated with a default file-storage container provided by the operating system independently of the one or more registered or unregistered programs; and a file-operation window accessed by any of said one or more* registered or unregistered application programs when any of said one or more register or unregistered application programs are executed, wherein [each file-operations] *the file-operation window* window includes a *desktop* link [to the desktop] *icon that, in response to selection by a user, displays the predetermined file-container icon within the file-operation window.*

17. A computer system for executing one or more registered or unregistered [applications] *application programs* and an operating system, the system comprising:

a predetermined file-storage container provided by the operating system independently of the one or more registered or unregistered application programs;

when any of said one or more registered or unregistered application programs are executed[:]*;* means for determining whether [one of] the [applications] *executed application program* has specified a folder for storing files related to the [one] *executed* application *program*;

means for determining whether the [one] *executed* application has redirected file storage from the *specified* folder to a current folder; *and* means for determining whether files within the current folder are of one or more particular types; and operating system means for automatically setting a default folder for storing files related to the [one] *executed* application[,] *program, wherein the operating system sets the default folder to be the predetermined file-storage container,* provided that the [one] *executed* application *program* has not specified a folder for storing files, that the *executed* application *program* has not redirected file storage to the current folder, and that no file stored within the current folder is of the one or more particular types.

18. *A computerized system comprising:*

*an operating system providing a graphical user interface and a file-operation window associated with at least one of a file open and a file save operation;*

*one or more application programs; and*

*a predetermined file-storage container provided by the operating system independently of the one or more application programs, wherein the operating system defines the predetermined file-storage container as a default file-storage container for the file-operation window when the file-operation window is accessed by any of said one or more application programs.*

19. *A computerized system as defined in claim 18, wherein the operating system further provides a destination menu item representing the default file-storage container, the destination menu item associated with a "Send To" menu for a file to permit the file to be moved or copied to the default file-storage container.*

20. *A computerized system as defined in claim 18, wherein the operating system provides a desktop display at a highest level of the graphical user interface, the operating system further providing a predetermined file-container icon on the desktop display representing the default file-storage container.*

21. *A computerized system as defined in claim 20, wherein the file-operation window includes a desktop link icon that, in response to selection by a user, displays the predetermined file-container icon within the file-operation window.*

\* \* \* \* \*